United States Patent [19]
Summers, III et al.

[11] Patent Number: 5,678,810
[45] Date of Patent: Oct. 21, 1997

[54] PNEUMATIC SUSPENSION SYSTEM

[75] Inventors: Herbert Stanley Summers, III, Trotwood; Jay Michael Shores, Miamisburg; Stephen Carey Hagwood, Dayton; Frank Robinson, Centerville; William Charles Kruckemeyer, Beaver Creek, all of Ohio

[73] Assignee: General Motors Corporation, Detroit, Mich.

[21] Appl. No.: 550,137

[22] Filed: Oct. 30, 1995

[51] Int. Cl.[6] .................. F16F 9/00; B60G 13/00
[52] U.S. Cl. ........................... 267/220; 267/64.28
[58] Field of Search ................ 267/220, 64.21, 267/64.23, 64.27, 64.28, 64.24; 280/668, 671, 672, 673

[56] References Cited

U.S. PATENT DOCUMENTS

| | | | |
|---|---|---|---|
| 3,246,905 | 4/1966 | Morgan | 267/64.21 X |
| 4,067,558 | 1/1978 | Keijzer et al. | 267/34 |
| 4,618,127 | 10/1986 | Le Salver et al. | 267/220 |
| 4,673,171 | 6/1987 | Buma | 267/8 R |
| 4,690,430 | 9/1987 | Buma | 280/708 |
| 4,961,594 | 10/1990 | Pees | 280/693 |
| 5,009,401 | 4/1991 | Weitzenhof | 267/64.21 |
| 5,074,579 | 12/1991 | Evangelisti | 267/220 X |
| 5,180,144 | 1/1993 | Hellyer et al. | 267/64.28 X |
| 5,342,029 | 8/1994 | Carter | 267/220 |

Primary Examiner—Peter M. Poon
Attorney, Agent, or Firm—Jeffrey A. Sedlar

[57] ABSTRACT

A pneumatic suspension system including an air spring in combination with a damper provides a way of mounting to a vehicle with a dual path mount. The air spring includes a canister in combination with a flexible element defining a variable pressure chamber. A mounting plate is captured about the canister by a nut. The nut has an air passageway for inflating and relieving the air spring and for providing a selectively open communicative path between the air spring and a remote volume that extends through the mount.

3 Claims, 2 Drawing Sheets

PNEUMATIC SUSPENSION SYSTEM

BACKGROUND OF THE INVENTION

The present invention relates to a pneumatic suspension system for vehicles.

It is known to provide a vehicle suspension system that includes a compliant element, in particular a spring, in combination with a damping element such as a strut or a shock. The compliant element and the damping element extend between the vehicle's body and wheels. The spring is typically of a leaf or coil type steel construction or a pneumatic type.

A pneumatic type spring is generally a column of gas that is confined within a rubber and metal container. Spring action results from the compression and expansion of the gas. Such a pneumatic spring supports the weight of the vehicle and utilizes the elasticity of the confined gas as an energy medium. A commonly used gas in pneumatic springs is air.

A known type of pneumatic suspension system conventionally used on vehicles includes a rolling lobe air spring in combination with a modified strut type damper. One end of the air spring's flexible member is clamped to a metal support and the other end is clamped to the strut's reservoir tube which also acts as an air spring piston. This type of a pneumatic suspension system provides a means to compensate for changes in the loading of the vehicle and to provide for automatic leveling by varying the amount of gas in the flexible member of the air spring arrangement.

A challenge is involved in providing a pneumatic suspension system which includes an air spring in combination with a damper. The problem that must be overcome is to determine optimum packaging of the air spring. The packaging must be such that it does not unduly subtract from the active travel of the damper while concurrently, adequate support must be provided in mounting the suspension system.

This problem is complicated when the packaging must be such that a dual path mount can be used wherein one load path is provided for the damper and a second load path is provided for the air spring. This is particularly the case when a dual rate air spring is used. A dual rate air spring that selectively communicates with a remote volume must have a sufficiently large communication channel to ensure proper air flow. This is so that the actual spring rate of the air spring is not effected by inordinate flow path pressure drops when the spring is in communication with the remote volume.

SUMMARY OF THE INVENTION

The present invention provides a means of supporting a pneumatic suspension system while ensuring that proper air flow to a compliant element is maintained and adequate structural integrity is provided to withstand variable vehicle loading and road input conditions. In particular, the pneumatic suspension system includes an air spring as the compliant element and a damper in combination therewith, mounted to a vehicle.

A crown shaped metal canister is provided that extends through the pneumatic suspension system's mount and which is adaptable for use with a turnable strut type suspension. The canister engages a unique nut which secures the pneumatic suspension system to the mount and provides a reliable means of communicating gas to inflate and relieve the air spring. Input forces on the air spring are taken up by the canister and nut arrangement and transferred to the mount in the vehicle.

Preferably, the assembly includes a dual rate mount that includes an independent means of transferring input forces from the damper's rod to the mount and therethrough, to the vehicle. The air spring's flexible member engages the canister and the damper to provide a pressurized air chamber. Means are preferably provided for varying the gas charge within the air chamber to vary the spring rate of the air spring by providing a means of selective communication with a remote volume.

In this regard, the invention includes a means of maintaining a sufficiently large communication route between the air spring and the remote volume so that acceptably soft rate characteristics are achievable. In addition, by selectively interrupting communication between the air spring and the remote volume in response to vehicle operational conditions, enhanced load carrying and handling characteristics are provided.

DETAILED DESCRIPTION OF THE PRESENTLY PREFERRED EMBODIMENT

Figure 1:
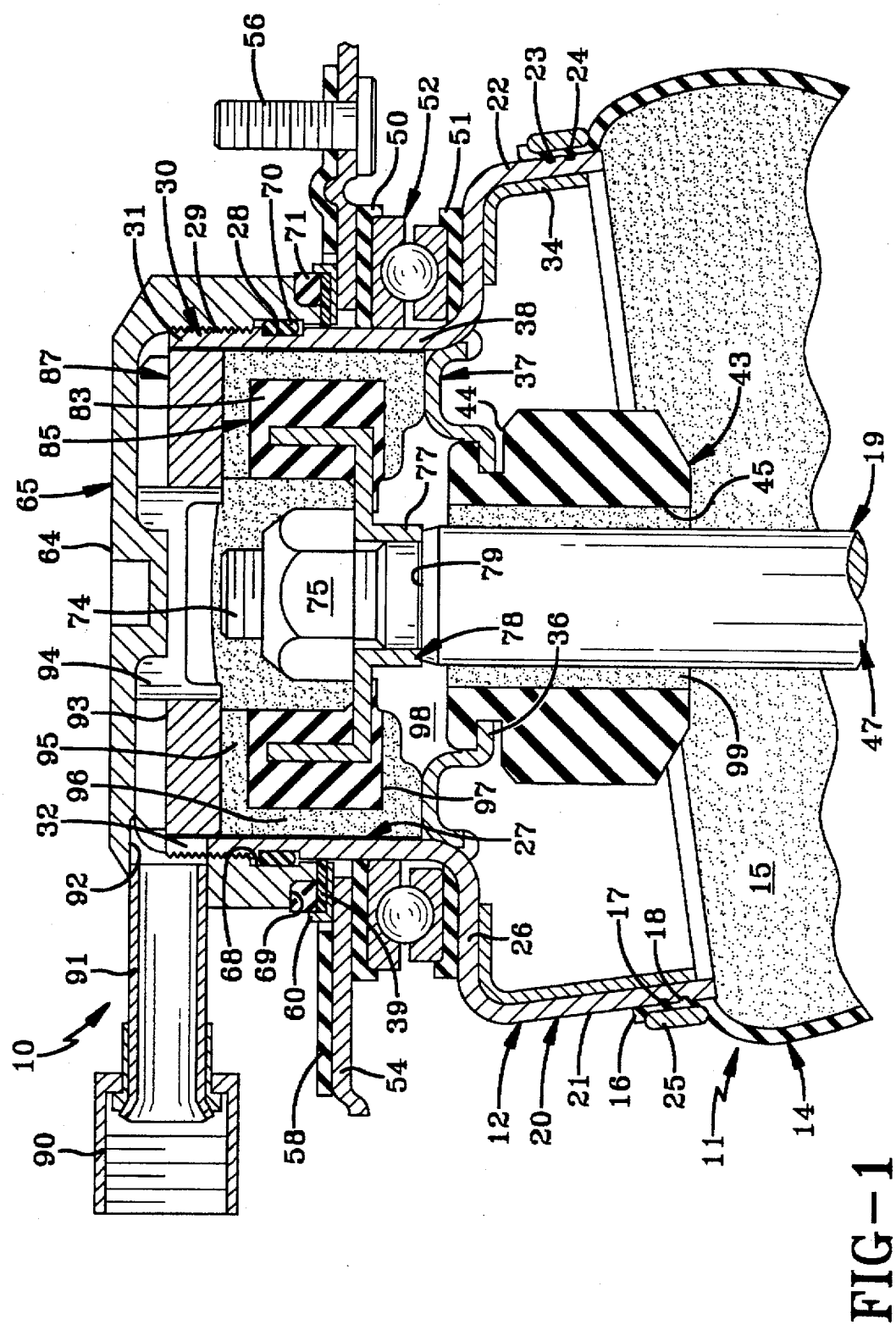
FIG. 1 is a fragmentary cross sectional illustration of a pneumatic suspension system.

Referring to the drawings, illustrated in FIG. 1 is the mounting area of a pneumatic suspension system 10 in accordance with the present invention. In general, canister 12 and flexible member 14 provide a pressurized air chamber 15 forming an air spring designated generally, as 11. The canister 12 is a rigid element formed of metal or durable plastic and in the present embodiment is steel. The flexible member 14 is fabricated of a reinforced rubber construction and in the present case is provided in a rolling lobe type arrangement, although various other air spring types may be utilized.

The flexible member 14 includes an upper end 16 on which is formed a pair of annular ribs 17 and 18. The lower end of the flexible member 14 (not illustrated), is conventionally connected to the reservoir tube (not illustrated) of the damper 19.

Canister 12 includes an annular lower leg 20 that has an inboard side 21 extending a length greater than the length of the outboard side 22. In operation, this elliptical construction is intended to compensate for transverse loading on the pneumatic suspension system 10.

Figure 2:
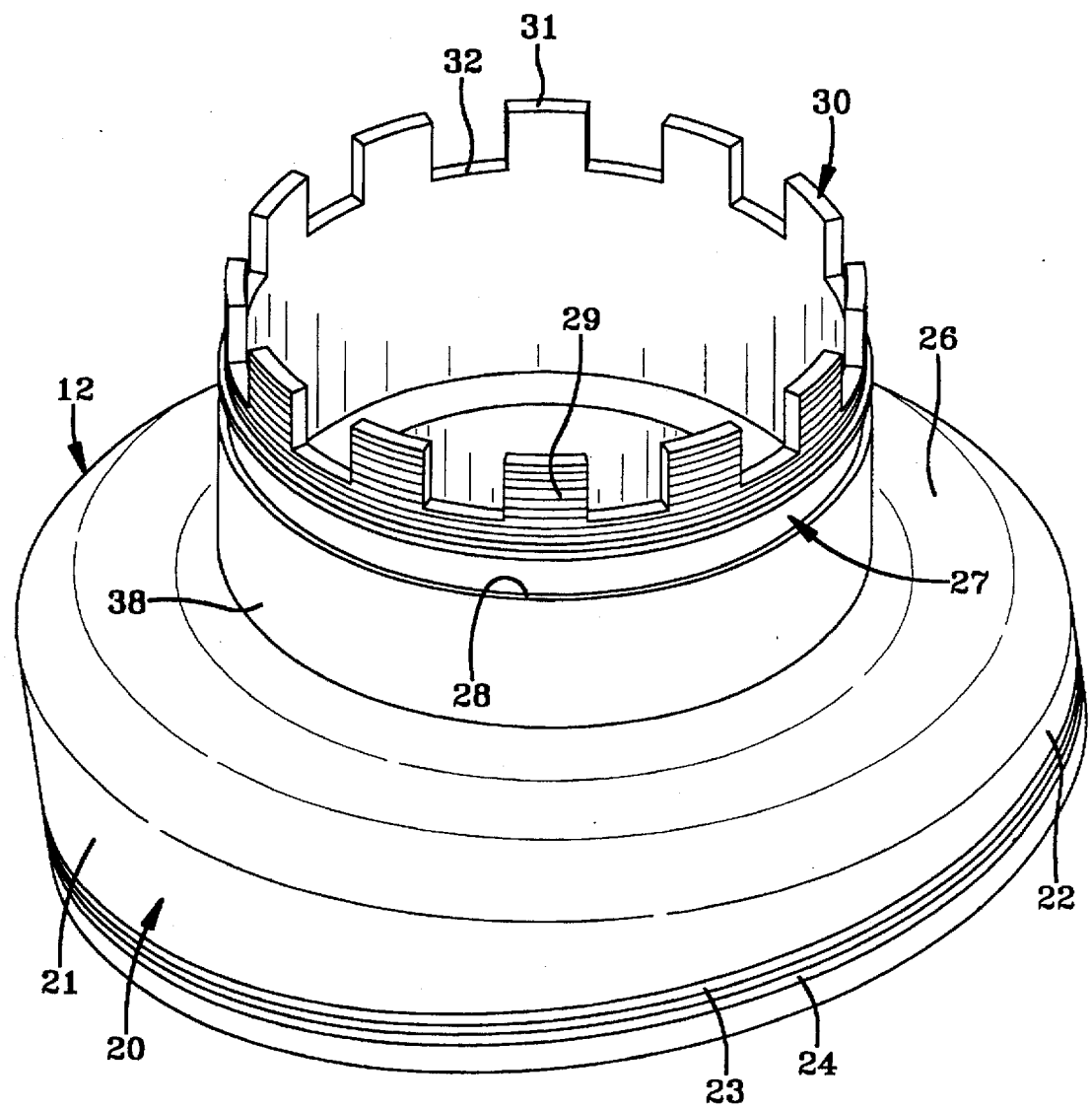
FIG. 2 is a perspective view of a canister for the pneumatic suspension system of FIG. 1.

The canister 12 is more clearly illustrated in FIG. 2 and therefore, reference is additionally directed thereto. The annular leg 20 of canister 12 includes a pair of annular grooves 23 and 24. As shown in FIG. 1, the annular ribs 17 and 18 of flexible member 14 are disposed in the annular grooves 23 and 24 of the canister 12 and are held therein by crimp ring 25 which maintains flexible member 14 in gas-tight engagement with canister 12.

Canister 12 also includes annular shoulder 26 which is disposed in a generally horizontal orientation and cylindrical portion 27 which is disposed in a generally vertical orientation. Cylindrical portion 27 includes an annular groove 28 and an exterior threaded segment 29. The annular shoulder 26 is oriented generally normal to the cylindrical portion 27 and the annular leg 20. The annular leg 20 and annular shoulder portion 26 form a body section of the canister 12.

The top end of cylindrical portion 27 includes an upper crowned portion 30 formed by a continuous series of tabs and notches representative of which are tab 31 and notch 32. The series of tabs and notches extend completely around the circumference of upper crowned portion 30. The exterior threaded segment 29 extends around the tabs and for a segment of the cylindrical portion 27 therebelow.

An annular support 34 having a generally L-shaped cross section with an upper horizontal leg and a lower vertical leg is fixed within canister 12 and closely engaged therewith to provide added structural support and integrity thereto. An annular mount retainer 37 is fixed inside canister 12 at the lower end 38 of cylindrical portion 27.

The annular mount retainer 37 includes an inwardly directed terminal leg 36 which forms a round opening. The inwardly directed terminal leg 36 is disposed in a stepped relationship below the remainder of mount retainer 37. An annular resilient bumper 43 is suspended on the terminal leg 36 of mount retainer 37.

The annular resilient bumper 43 includes an annular groove 44 which contains terminal leg 36, fixing the bumper 43 in the round opening. The bumper 43 includes an open inside diameter 45 through which damper rod 47 extends. Open inside diameter 45 is larger than the diameter of damper rod 47 providing an open annular passageway 99 through the bumper 43.

An annular bearing assembly 52 is captured between cushion washers 50 and 51 and is carried about cylindrical portion 27 of canister 12 upon annular shoulder 26. A mounting plate 54 includes a central opening through which cylindrical portion 27 extends, with mounting plate 54 resting upon cushion washer 50. Mounting plate 54 includes a plurality of mounting studs, representative of which is mounting stud 56 for attaching the pneumatic suspension system 10 to the shock tower of a vehicle (not illustrated).

An isolator pad 58 includes a central opening and is also received over cylindrical portion 27 on mounting plate 54. When the pneumatic suspension system 10 is installed in a vehicle, the isolator pad 58 is compressed between mounting plate 54 and the shock tower. A hold washer 60 has an L-shaped cross section, includes a central opening and is received over cylindrical portion 27 within isolator pad 58. Hold washer 60 includes a horizontal leg engaging mounting plate 54 and a vertical leg pointing upwardly. A ring 39 of low friction material is captured against hold washer 60 as cap nut 65 is threaded onto canister 12.

A hexagonal cap nut 65 includes an internal threaded section engaging the external threaded section 29 of canister 12. Cap nut 65 also includes an internal annular groove 68 and an external annular groove 69. Cap nut 65 has a closed end 64 that cooperates in defining a chamber 94. A seal 70 is carried within interior annular groove 68 of cap nut 65 and annular groove 28 of canister 12. A rubber washer 71 is captured between exterior annular groove 69 of cap nut 65 and the vertical leg of hold washer 60.

Through the foregoing structure, the mounting plate 54 is captured between the cap nut 65 and the canister 12 providing structural support and a means of engaging the vehicle for the air spring 11. The assembly is turnable for steering operation of the vehicle with hold washer 60 remaining stationary against mounting plate 54 and ring 39 providing a bearing against the top surface thereof as the canister 12 and cap nut 65 rotate with the damper 19.

The damper rod 47 includes a threaded segment 74 upon which is threaded a nut 75 capturing the annular vertical leg 77 of metal mount insert 78 against annular shoulder 79 of damper rod 47. A rubber mount 85 is composed of elastomeric element 83 which is molded about rigid mount insert 78. The mount 85 is captured between mount retainer 37 and cap nut 65 with a preload washer 87 positioned between cap nut 65 and mount 85.

As the cap nut 65 is threaded onto the canister 12, the mount 85 is compressed between the mount retainer 37 and the preload washer 87. The amount of preload is determined by the thickness of the preload washer 87. The preload washer 87 imparts a bias to mount 85 to selectively tune the performance of mount 85. The mount 85 transfers loads between the mounting plate 54 and the damper rod 47 and provides isolation therebetween.

The cap nut 65 includes an opening 92 within which a tubular element 91 is fixed. The tubular element 91 includes a nut 90 for attachment to a conduit (not illustrated) which leads to a remote volume with a variable pressure source (not illustrated). The preload washer 87 includes a series of radially oriented grooves, representative of which is groove 93, that in combination with the series of notches 32 as illustrated in FIG. 2, ensure that a means of communication is provided between the opening 92 and chamber 94 within cap nut 65 regardless of the specific assembled orientation of the cap nut 65 relative to the canister 12. Therefore, the cap nut 65 and canister 12 are easily assembled together without a specific relative orientation being necessary to effect an open passage for air flow.

A relatively large gas communication route is provided between the opening 92 and the pressure chamber 15 of the air spring 11. The communication route extends through groove 93, chamber 94, passageways 95, 96 and 97, chamber 98 and passageway 99. The groove 93 is one of four grooves extending radially across the top of the preload washer 87. The chamber 94 is defined within the cap nut 65 by preload washer 87 and mount 85. Passageways 95, 96 and 97 are provided by the molded shape of the elastomeric element 83 of the mount 85.

Through the foregoing structure a means for ensuring proper air flow to the air spring 11 and providing adequate structural support to the pneumatic suspension system 10 is achieved. An open air flow path to inflate and relieve the pressure chamber 15 is achieved through a large flow path arrangement provided by a unique canister retention means.

What is claimed is:

1. A pneumatic suspension system comprising:
   a mounting plate having an opening;
   a canister with a cylindrical portion that extends through the opening of the mounting plate and has a threaded exterior: the canister having a body section connected to the cylindrical portion; and
   a nut threaded on the cylindrical portion capturing the mounting plate on the canister between the nut and the body section wherein the canister has a crowned end including a series of notches wherein the crowned end is disposed within the nut.

2. A pneumatic suspension system according to claim 1 wherein the nut includes a closed end and an air opening wherein the air opening registers with at least one of the notches.

3. A pneumatic suspension system comprising:
   a canister having an annular leg and an annular shoulder with a cylindrical portion extending therefrom that includes a crowned end with an alternating series of notches and tabs;
   a flexible member fixed to the annular leg of the canister, the flexible member and the canister cooperating in defining a pressure chamber;

a cap nut having a closed end and an air opening threadedly received on the crowned end such that the air opening registers with at least one of the notches on the canister;

a mounting plate captured between the canister and the cap nut;

a bearing assembly disposed between the mounting plate and the annular shoulder of the canister;

a preload washer carried within the cap nut adjacent the closed end;

a mount retainer having an annular stepped construction carried by the canister; and a damper mount compressed between the preload washer and the mount retainer.

* * * * *